US006932899B2

(12) United States Patent
Bonelli et al.

(10) Patent No.: US 6,932,899 B2
(45) Date of Patent: Aug. 23, 2005

(54) POOL SKIMMER BASKET KIT

(75) Inventors: Jonathan J. Bonelli, New York, NY (US); Matt Cowdell, Holtsville, NY (US); Mitchell Saccoccio, Lake Ronkonkoma, NY (US)

(73) Assignee: Stealth Industries Ltd., Kowloon (CN)

( * ) Notice: Subject to any disclaimer, the term of this patent is extended or adjusted under 35 U.S.C. 154(b) by 89 days.

(21) Appl. No.: 10/238,750

(22) Filed: Sep. 10, 2002

(65) Prior Publication Data

US 2004/0045895 A1 Mar. 11, 2004

(51) Int. Cl.[7] .............................. E04H 4/16; B01D 35/02
(52) U.S. Cl. .................... 210/85; 210/497.01; 210/470; 4/292; 4/496
(58) Field of Search .................................. 210/470, 452, 210/337, 338, 315, 85, 541, 497.01; 4/496, 289, 290, 286, 292; 206/526, 503–510; 312/43; 220/4.27

(56) References Cited

U.S. PATENT DOCUMENTS

| 3,627,115 | A | * | 12/1971 | Samalon | 206/497 |
| 4,212,740 | A | * | 7/1980 | Greene | 210/169 |
| 4,743,368 | A | * | 5/1988 | Gates | 210/163 |
| 5,372,718 | A | * | 12/1994 | Zebian | 210/301 |
| 5,924,563 | A | * | 7/1999 | Salyers | 206/223 |
| 6,387,261 | B1 | * | 5/2002 | Mojena | 210/315 |
| 6,537,448 | B2 | * | 3/2003 | Houk | 210/164 |
| 6,572,765 | B2 | * | 6/2003 | Lincke | 210/169 |

FOREIGN PATENT DOCUMENTS

DE         3724803 A   *   2/1989    ........... B01D/35/16

OTHER PUBLICATIONS

English Translation of DE 3724803 A1, Feb. 1989.*

* cited by examiner

*Primary Examiner*—Terry K. Cecil
(74) *Attorney, Agent, or Firm*—Dilworth & Barrese, LLP

(57) ABSTRACT

A pool skimmer basket kit for cleaning pool water is provided, which includes: a first skimmer basket having a peripheral wall portion and a bottom wall portion, each wall portion of the first skimmer basket defining therein a plurality of perforations of a first size; and a second skimmer basket having a peripheral wall portion and a bottom wall portion, each wall portion of the second skimmer basket defining therein a plurality of perforations of a second size. The pool skimmer basket kit of the invention may further include a third skimmer basket, the third skimmer basket having a peripheral wall portion and a bottom wall portion, each wall portion of the third skimmer basket defining therein a plurality of perforations of a third size. Each skimmer basket has a different color to one another for facilitating identification by the user.

16 Claims, 2 Drawing Sheets

POOL SKIMMER BASKET KIT

FIELD OF THE INVENTION

The present invention generally relates to a filtration device, and more particularly to a pool skimmer basket kit for use with a conventional pool skimmer system for cleaning pool water.

BACKGROUND OF THE RELATED ART

Conventional swimming pools typically include a water filtration system. Water filtration systems generally include a pump which circulates water within the swimming pool, causing the swimming pool water to pass through a variety of filters and filtering media. One filtering device common to most swimming pools is a pool skimmer, which is typically installed in the side wall of the swimming pool at or about the desired water level. Conventional pool skimmer devices may generally include a "trap" installed adjacent to an opening in the side wall of the swimming pool, wherein a flap door may be installed in the opening which allows surface debris to float over the door and into the trap. Once the debris has floated over the door, the door closes the opening as water and debris attempt to egress from trap, thus preventing the debris from returning to the swimming pool area. Normally, a strainer or skimmer basket can be inserted in the trap to act as a primary filter device in collecting items and debris in the trap. Depending upon the time of year and the amount of debris allowed to enter the pool, pool skimmer baskets may need to be emptied as often as once a day, but in any event, skimmer baskets should normally be emptied on a regular basis.

Skimmer baskets generally include an open top, a cylindrical body portion, and a bottom portion formed integrally with the body portion. The body and bottom portions define a rigid grid-like structure with a great number of perforations that allow passage of water through the basket, while capturing items or debris inside the basket. Perforation size of known skimmer baskets ranges generally between about 1 mm and about 5 mm. Users may select skimmer baskets with a suitable perforation size at their choice depending upon their needs or preference.

In addition to the pool skimmer, filtration systems typically include a lint basket and a filter disposed adjacent the pump. Such lint baskets or filters typically have a filter rating finer than skimmer baskets, and thus are suitable for filtering finer debris that passes a skimmer basket. Such lint baskets or filters should be cleaned regularly during the operation. As a consequence, if the user utilizes a skimmer basket having perforations finer than conventional skimmer baskets, the cleaning cycle of the filter and/or the lint basket (conventionally called as a "filter cycle") becomes longer since less amount of debris, only those smaller than the perforation size of the basket, passes the skimmer basket and accumulates within the filter and/or the lint basket. On the contrary, if the user utilizes a skimmer basket with larger perforations, the filter cleaning cycle becomes shorter. Conventional skimmer baskets were sold by the piece in the market. Thus, pool operators typically purchase several skimmer baskets with different perforation sizes according to their cleaning needs and preference.

Accordingly, it would be advantageous to have a pool skimmer basket kit, which includes a plurality of skimmer baskets with different perforation sizes to meet various pool cleaning needs.

SUMMARY OF THE INVENTION

Accordingly, the present invention is directed to a pool skimmer basket kit for cleaning pool water, which comprises: a first skimmer basket including a peripheral wall portion and a bottom wall portion, each wall portion of the first skimmer basket defining therein a plurality of perforations of a first size; and a second skimmer basket including a peripheral wall portion and a bottom wall portion, the first and second skimmer baskets having substantially uniform shape and size, each wall portion of the second skimmer basket defining therein a plurality of perforations of a second size. The pool skimmer basket kit of the invention may further include a third skimmer basket, the third skimmer basket having a peripheral wall portion and a bottom wall portion, each wall portion of the third skimmer basket defining therein a plurality of perforations of a third size. Each skimmer basket preferably has a different color to facilitate immediate identification by the user. Furthermore, the basket may be stackable for easy packaging and storage.

BRIEF DESCRIPTION OF THE DRAWING

Preferred embodiments of the invention are described herein with reference to the drawings, wherein.

DETAILED DESCRIPTION OF THE PREFERRED EMBODIMENT

Figure 1:
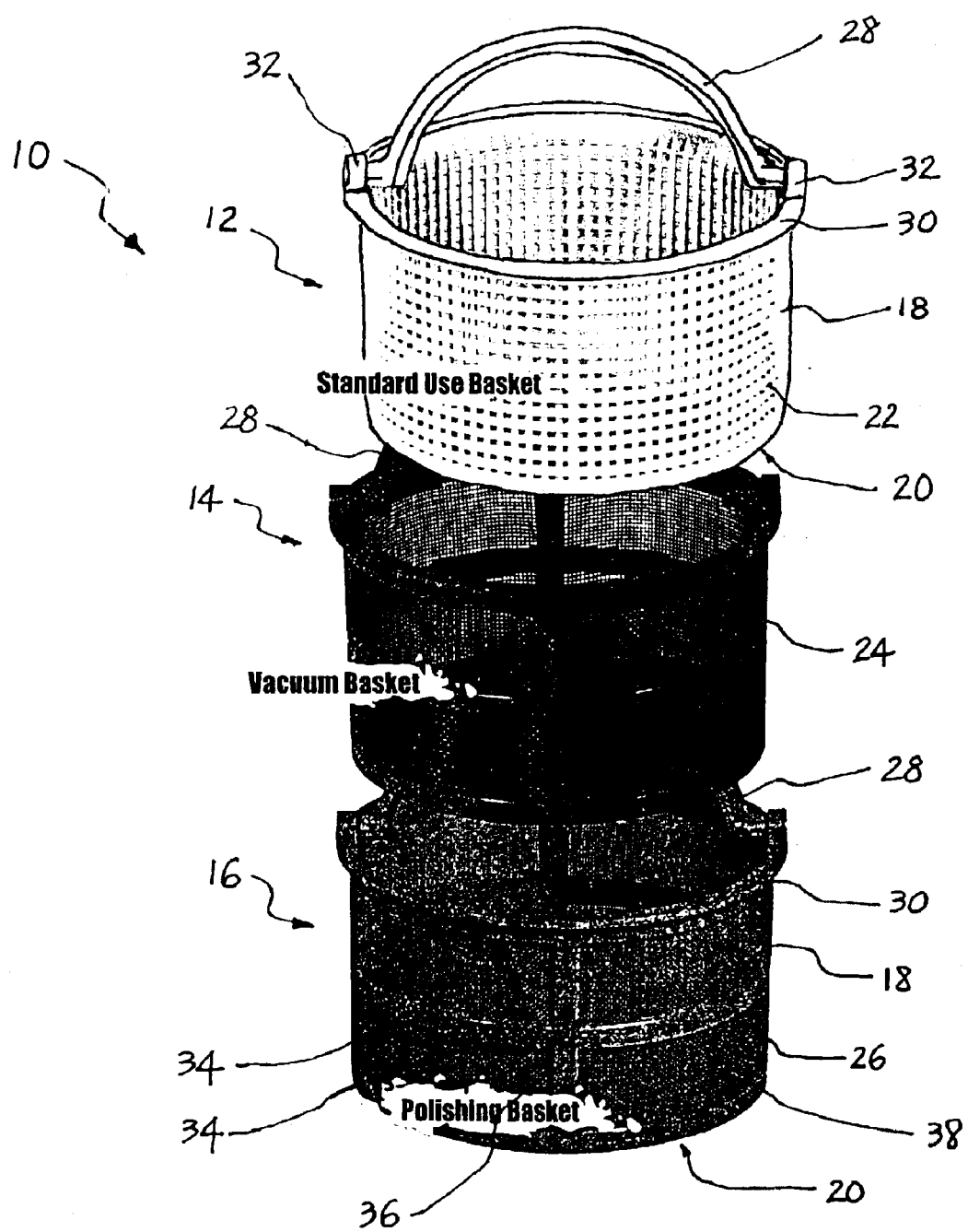
FIG. 1 is a perspective view illustrating the skimmer basket kit of the present invention, which includes a plurality of (e.g., three) pool skimmer baskets.

Referring now specifically to the drawings, a pool skimmer basket kit 10 according to the present invention is illustrated herein. Skimmer basket kit 10 includes a set number of skimmer baskets of similar configuration. In the preferred embodiment, skimmer basket kit 10 includes, for example, three baskets 12, 14 and 16. However, the number of such baskets may be different, for example, the kit may include two or four baskets. Each skimmer basket 12, 14 and 16 is preferably made of plastic or other corrosion resistant material, and includes peripheral wall portion 18 and bottom wall portion 20, each having respective perforations 22, 24, 26 of different sizes for filtering items or debris. Perforations 22 have a hole size similar to that of conventional skimmer baskets, e.g., between about 1 mm and about 5 mm. Perforations 24 have a hole size smaller than perforations 22, e.g., between about 0.5 mm and about 1 mm. Perforations 26 have a hole size further smaller than perforations 24, e.g., less than about 0.5 mm.

Skimmer basket 12 is usable for filtering leaves, twigs, large insects and relatively large items and suitable for every day operation. Skimmer baskets 12 can be also used when adding chemicals, such as chlorinating tablets, into the baskets for sanitizing the pool. Skimmer basket 14 with fine perforations 24 is for filtering small particles including leaf particles, small insects, grass, pine needles, etc., and is also suitable for use in conjunction with manual or automatic pool vacuums. Skimmer basket 16 with much finer perforations 26 is for filtering fine particles including pollen, clothing fibers, etc., and is particularly suitable for cleaning the pool once or twice during the season.

Skimmer baskets 12, 14 and 16 further include rotatable handle 28 attached adjacent rim 30 of the wall portion 18. Hinge portions 32 are provided for facilitating fixation of handle 28 to the wall portion 18. For reinforcing the strength of the basket structure, horizontal and vertical frame portions 34 and 36 may be provided to the side wall portion 18 and/or the bottom wall portion 20. Wall portions 18, 20 of skimmer baskets 12, 14, 16 can be unitarily made by conventional plastic mold methods. Alternatively, utilizing known technology, lint or plastic screen 38 may be attached to frame portions 34, 36 which provide basic structural outline of the skimmer basket.

Figure 2:
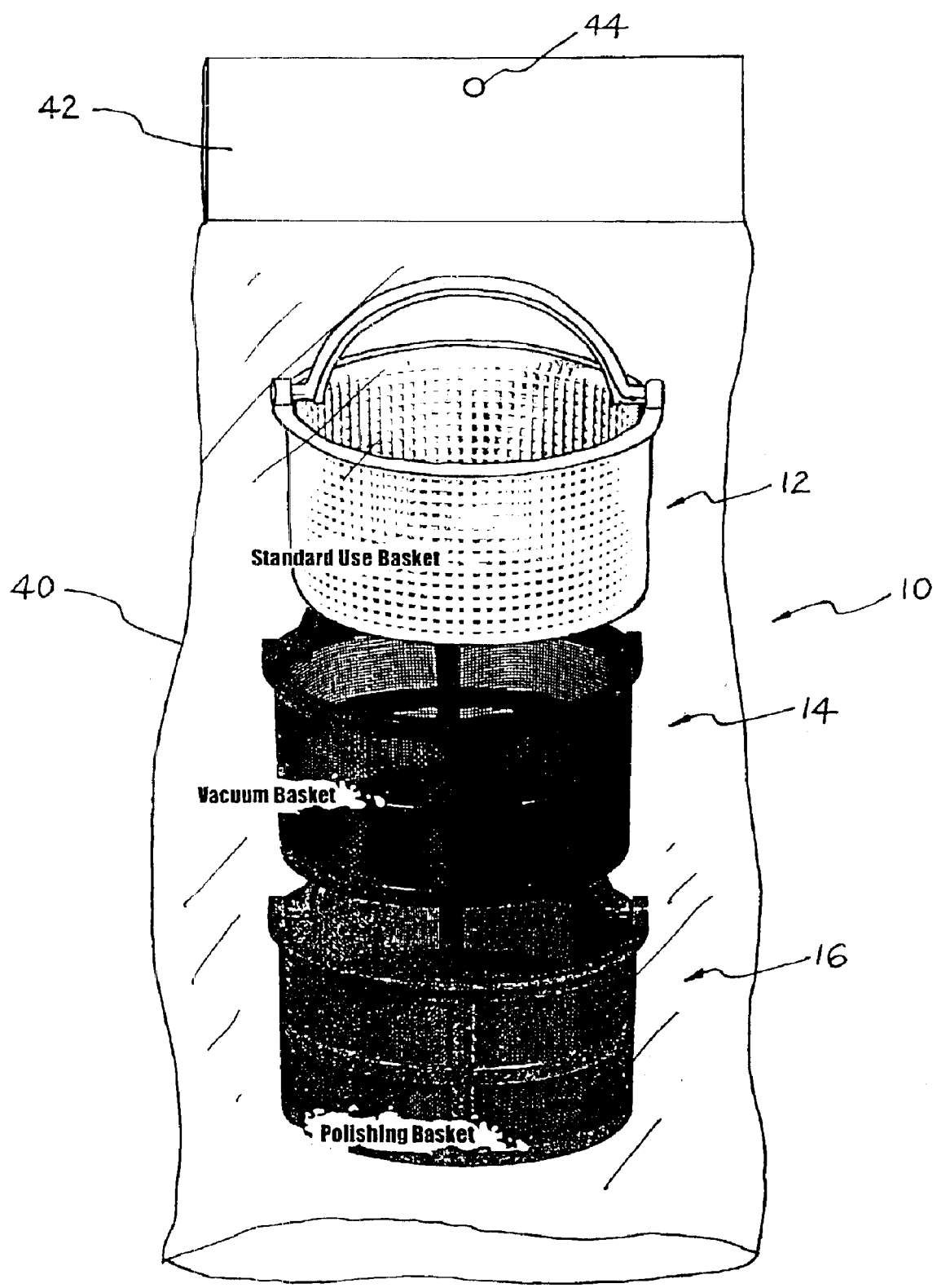
FIG. 2 is a perspective view illustrating the skimmer basket kit supplied in a conventional plastic package.

As shown in FIGS. 1 and 2, skimmer baskets 12, 14 and 16 preferably have different colors for facilitating quick identification by the user. For example, basket 12 has white color, basket 14 has red color, and basket 16 has blue color. Any color combination may be available if it facilitates such identification at a glance.

Referring to FIG. 2, skimmer basket kit 10, while stacked in a compact form, is preferably supplied in a conventional flexible plastic package or enclosure 40. Plastic package 40 may be transparent or opaque with operating instructions therein. Plastic package 40 further includes cardboard 42 containing hanging hole 44 therein to facilitate hanging of such kits for display in the market. Instead of the plastic package, other conventional packages may be utilized, e.g., paper carton box, etc.

It will be understood that various modifications may be made to the embodiments disclosed herein. Therefore, the above description should not be construed as limiting the scope of the invention, but merely as exemplifications of the preferred embodiments. Those skilled in the art will envision other modifications within the scope and spirit of the claims appended hereto.

What is claimed is:

1. A pool skimmer basket kit for cleaning pool water, comprising:

a first skimmer basket including a peripheral wall portion and a bottom wall portion, each wall portion of the first skimmer basket defining therein a plurality of perforations of a first size; and a second skimmer basket including a peripheral wall portion and a bottom wall portion, each wall portion of the second skimmer basket defining therein a plurality of perforations of a second size, different from said first size, wherein the first and second skimmer baskets have substantially uniform shape and size and are adapted to be used individually and exclusively within a pool skimmer to clean the pool water from particles of different sizes, each said basket being a different color to visually indicate said respective perforation size, the wall portion of at least one of the first and second skimmer baskets further including a frame portion configured such that the wall portion has a plurality of perforated segments isolated from one another by the frame portion, and said skimmer baskets being enclosed within a packaging comprising flexible plastic and/or cardboard.

2. The pool skimmer basket kit of claim 1, further comprising a third skimmer basket, the third skimmer basket having a peripheral wall portion and a bottom wall portion, each wall portion of the third skimmer basket defining therein a plurality of perforations of a third size.

3. The pool skimmer basket kit of claim 2, wherein each skimmer basket includes a handle attached adjacent an upper portion of the peripheral wall portion.

4. The pool skimmer basket kit of claim 2, wherein the third skimmer basket is a color different from the colors of the other skimmer baskets.

5. The pool skimmer basket kit of claim 2, wherein the first perforation size is between about 1 mm and about 5 mm, the second perforation size is between about 0.5 mm and about 1 mm, and the third perforation size is less than about 0.5 mm.

6. The pool skimmer kit of claim 2, wherein the first, second and third skimmer baskets each are made of plastic material.

7. The pool skimmer basket kit of claim 1, wherein at least one of the skimmer baskets further include a screen attached to the frame portion.

8. The pool skimmer kit of claim 1, wherein substantially horizontal and/or vertical frame portions are provided on the peripheral wall and/or bottom wall portions of at least one of the baskets.

9. The pool skimmer basket kit of claim 1, wherein the peripheral wall portion of each said first and second skimmer baskets further including a frame constituted by horizontal and vertical frame portions defining basic structural outlining of the basket and a screen attached to the horizontal and vertical frame portions.

10. The pool skimmer basket kit of claim 9, wherein each skimmer basket has eight separate screen portions divided by the horizontal and vertical frame portions.

11. The pool skimmer basket kit of claim 9, wherein each skimmer basket includes a handle attached adjacent an upper portion of the peripheral wall portion.

12. The pool skimmer basket kit of claim 1, further comprising a third skimmer basket, the third skimmer basket having a peripheral wall portion and a bottom wall portion, each wall portion of the third skimmer basket defining therein a plurality of perforations, wherein perforation size in the third skimmer basket is between about 1 mm and about 5 mm, perforation size in the screens of the second skimmer basket is between about 0.5 mm and about 1 mm, and perforation size in the screens of the first skimmer basket is less than about 0.5 mm.

13. The pool skimmer basket kit of claim 12, wherein each skimmer basket includes a handle attached adjacent an upper portion of the peripheral wall portion.

14. The pool skimmer basket kit of claim 1, wherein said frame portions are unitarily made by conventional plastic technology.

15. The pool skimmer basket kit of claim 1, wherein said skimmer baskets are structured and arranged to be stacked in a compact form for easy packaging and storage.

16. The pool skimmer basket kit of claim 15, wherein the skimmer basket kit is supplied in said packaging while stacked in a compact form, the packaging being transparent or opaque and having a cardboard mounted at the top of the packaging containing a hole in the cardboard to facilitate hanging of the pool skimmer basket kit.

* * * * *